United States Patent [19]
Nago

[11] Patent Number: 6,078,609
[45] Date of Patent: Jun. 20, 2000

[54] RADIO COMMUNICATION SYSTEM USING FREQUENCY HOPPING, AND METHOD OF CONTROLLING SAME

[75] Inventor: Hidetada Nago, Yokohama, Japan

[73] Assignee: Canon Kabushiki Kaisha, Tokyo, Japan

[21] Appl. No.: 08/732,715

[22] Filed: Oct. 18, 1996

[30] Foreign Application Priority Data

Oct. 20, 1995 [JP] Japan ................................. 7-297757
Oct. 15, 1996 [JP] Japan ................................. 8-272255

[51] Int. Cl.[7] ......................................... H04B 15/00

[52] U.S. Cl. ............................ 375/202; 370/436; 370/478

[58] Field of Search ............................. 375/200, 201, 375/203, 202, 205; 370/320, 321, 330, 436, 478, 408, 482, 492, 496

[56] References Cited

U.S. PATENT DOCUMENTS

| 586,142 | 1/1897 | Takiyasu et al. | 370/480 |
| 5,339,331 | 8/1994 | Beauchamp et al. | 375/202 |
| 5,394,433 | 2/1995 | Bantz et al. | 375/202 |
| 5,428,602 | 6/1995 | Kemppainen | 370/330 |
| 5,459,760 | 10/1995 | Watanabe | 375/202 |
| 5,463,659 | 10/1995 | Nealon et al. | 375/202 |
| 5,506,863 | 4/1996 | Meidan et al. | 375/202 |
| 5,541,954 | 7/1996 | Emi | 375/202 |
| 5,748,669 | 5/1998 | Yada | 375/202 |

*Primary Examiner*—Wellington Chin
*Assistant Examiner*—Congvan Tran
*Attorney, Agent, or Firm*—Fitzpatrick, Cella, Harper & Scinto

[57] ABSTRACT

When radio communication units communicate with each other, communication is performed using a hopping pattern obtained by shifting a hopping pattern that is used in communication between a radio control unit and the radio communication units.

50 Claims, 12 Drawing Sheets

FREQUENCY HOPPING SCHEME

FIG. 7

| CS | R | PR | UW | LCCH | GT |
|---|---|---|---|---|---|
| 8 | 4 | 62 | 8 | 160 | 20 |

LCCH-R FRAME STRUCTURE

| CS | R | PR | SYN | ID | FI | TS | NF |
|---|---|---|---|---|---|---|---|
| 8 | 4 | 62 | 31 | 63 | 2 | 8 | 8 |

| UW | LCCH | GT |
|---|---|---|
| 8 | 160 | 20 |

FSYN FRAME STRUCTURE AND LCCH-T FRAME STRUCTURE

FIG. 8

| CS | R | PR | UW | D | B | GT |
|----|---|----|----|----|---|----|
| 8 | 6 | 62 | 8 | 16 | 160 | 20 |

Rn FRAME STRUCTURE

| RV | PR | UW | D | B | GT |
|----|----|----|---|---|----|
| 12 | 62 | 8 | 16 | 160 | 20 |

Tn FRAME STRUCTURE

RADIO COMMUNICATION SYSTEM USING FREQUENCY HOPPING, AND METHOD OF CONTROLLING SAME

BACKGROUND OF THE INVENTION

1. Field of the Invention

This invention relates to a radio communication system using frequency hopping, as well as to a method of controlling this system.

2. Description of the Related Art

Frequency hopping involves dividing a certain frequency band into a plurality of narrower bands, adopting each of these bands as a frequency channel and transmitting a signal while changing from one frequency to another during the time it takes to send one bit of data. The number of times frequency is changed during the transmission of this one bit is referred to as the number of hops, the pattern of this change in frequency is referred to as a hopping pattern, and the time required to cycle through the hopping pattern is referred to as the hopping period.

Since frequency is thus changed in successive fashion in accordance with frequency hopping, data can be demodulated and a high degree of security can be maintained by changing from one frequency to another even if some of the frequencies develop noise or are disturbed by other systems.

In order to realize a system which transmits information between information devices such as computers using such frequency hopping, a technique that relies upon a small, high-speed PLL (phase-locked loop) is required. However, since such a technique still does not exist, it is necessary to provide each device with a plurality of oscillators. The result is circuitry of large size.

Accordingly, in currently existing systems, frequencies are not changed successively during one bit of data. Rather, the method employed involves transmitting a signal while changing frequency every several dozen bits of data. This method is referred to as frequency slow hopping. In this case, the anti-noise property originally possessed by the frequency hopping technique is sacrificed but excellent security can be maintained.

When it is required that many devices in a system communicate at the same time, all of these devices cannot communicate using the same hopping pattern. Accordingly, communication is performed using a hopping pattern that differs for each communication or for every few communications. Consequently, a plurality of hopping patterns are required in one system. However, if all of these hopping patterns are stored in all of the system devices, it will be necessary to provide each device with a large memory capacity.

Further, in the case of a system having a main unit, a method available is to perform communication by having the main unit decide, whenever communication is carried out, the hopping pattern to be used for the particular device that is to communicate. In this case, however, notification of all frequencies used in the hopping pattern employed must be given, one frequency at a time. This means that considerable time is required to notify the units of the hopping pattern.

Generally, in a system having a main unit, all of the calls within the system are implemented via the main unit. In a case where a large number of communications are performed simultaneously, increasing the number of lines between the main unit and terminal devices on both sides thereof places a heavy load upon the main unit.

Further, in a case where a terminal device A and a terminal device B communicate via the main unit, two hopping patterns are required, namely a hopping pattern between the terminal device A and the main unit and a hopping pattern between the terminal device B and the main unit. The result is a large number of hopping patterns. Accordingly, if the distance between the two terminal devices is such that they are capable of communicating with each other directly, it is desired that communication between the terminal devices be implemented using a hopping pattern different from the hopping patterns between the main unit and the terminal devices.

In order to realize communication between terminal devices using a hopping pattern different from the hopping patterns between the main unit and the terminal devices when the distance between the two terminal devices is such that they are capable of communicating with each other directly, it is necessary that the frequency channels be selected in such a manner that the same frequency channels will not be used simultaneously in the hopping pattern employed in communication between the main unit and the terminal devices and in the hopping pattern employed in communication between the terminal devices. The reason for this is that using the same frequency channels at the same time results in interference between the frequency channels.

SUMMARY OF THE INVENTION

An object of the present invention is to provide a method through which notification is given of hopping patterns in simple fashion and in a short period of time.

Another object of the present invention is to reduce the memory capacity needed to store the hopping patterns of a terminal device.

Yet another object of the present invention is to select a hopping pattern employed in communication between a main unit and terminal devices and a hopping pattern employed in communication between terminal devices in such a manner that identical frequency channels are not used at the same time.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 7 is a diagram showing the structures of an FSYN frame and LCCH-T, LCCH-R frames in the embodiment of the invention;

FIG. 8 is a diagram showing the structures of communication frames in the embodiment of the invention;

DESCRIPTION OF THE PREFERRED EMBODIMENT

Figure 1:
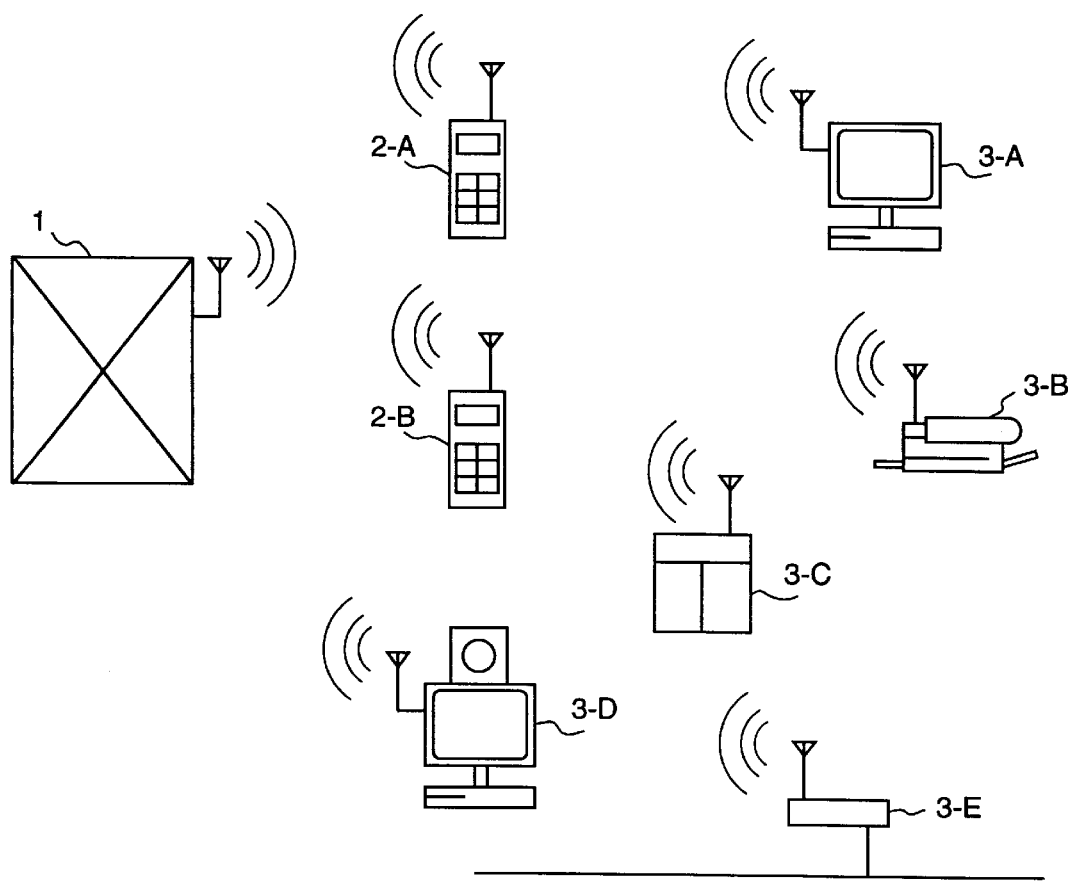
FIG. 1 is a diagram showing the configuration of a system according to an embodiment of the present invention.

FIG. 1 is a diagram useful in describing the configuration of a system according to an embodiment of the present invention.

As shown in FIG. 1, the system includes a main unit 1 having a switching function, radiotelephones 2-A, 2-B having a telephone function, and terminal devices 3-A, 3-B, 3-C, 3-D, 3-E connected to data terminals. The main unit 1 is also capable of being connected to a LAN or to a public telephone line depending upon the particular application. The terminal devices are not limited to a computer, namely terminal device 3-A, but may be a printer (3-B), a copier (3-C), a television conference terminal (3-D), a LAN bridge (3-E), and various other devices capable of performing data processing, such as an electronic camera, video camera and scanner.

Figure 2:
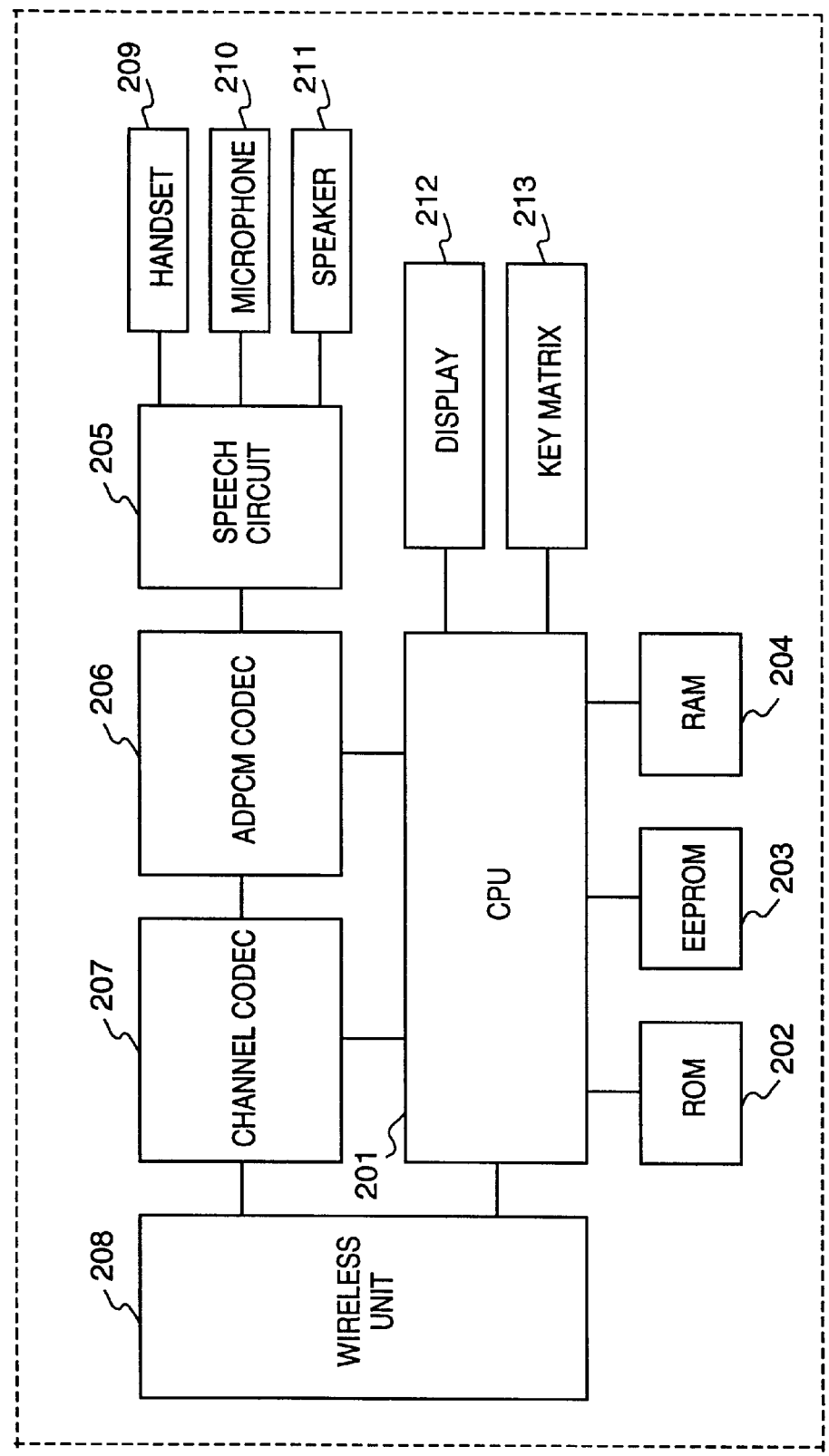
FIG. 2 is a block diagram showing the architecture of a radiotelephone according to the embodiment of the invention.

FIG. 2 is a block diagram illustrating the architecture of the radiotelephone 2-A, 2-B. Each radiotelephone includes a CPU 201 which administers overall control of the radiotelephone, including control of a wireless unit and call control. A ROM 202 stores the control program of the CPU 201. An EEPROM 203 stores the call code (system ID) of the system and the sub-ID of the radiotelephone. A RAM 204 stores various data for controlling the CPU 201 and provides a work area used for various computations. In addition, the RAM 204 is used to store hopping patterns used in telecommunication. A speech circuit 205 sends and receives speech signals to and from a handset 209, microphone 210 and speaker 211 under the control of the CPU 201. An ADPCM (adaptive differential pulse code modulation) codec 206, under the control of the CPU 201, converts an analog voice signal form the speech circuit 205 to an ADPCM code and then transmits the code to a channel code 207, described below, and converts an ADPCM-coded speech signal from the channel codec 207 to an analog voice signal and transmits the voice signal to the speech circuit. Under the control of the CPU 201, the channel codec 207 subjects the ADPCM-coded communication signal and control signals to processing such as scrambling and performs time-division multiplexing in predetermined frames. Under the control of the CPU 201, a wireless unit 208 modulates the digital signal received from the channel codec 207 in the form of frames, executes processing so that the signal can be transmitted wirelessly and then transmits the signal. Further, the wireless unit 208 demodulates the wirelessly received signal and processes the demodulated signal to a digital signal in the form of frames. The handset 209 enters and outputs voice signals in order to implement calls. The microphone 210 collects the sounds that constitute the voice signal. The speaker 211 provides an audible output of the voice signal. A display unit 212 displays a dialed number entered from a key matrix 213 as well as the status of use of outside lines. The key matrix 213 comprises dial keys for entering dial numbers and function keys such as keys for outside lines, a hold key and a speaker key.

Figure 3:
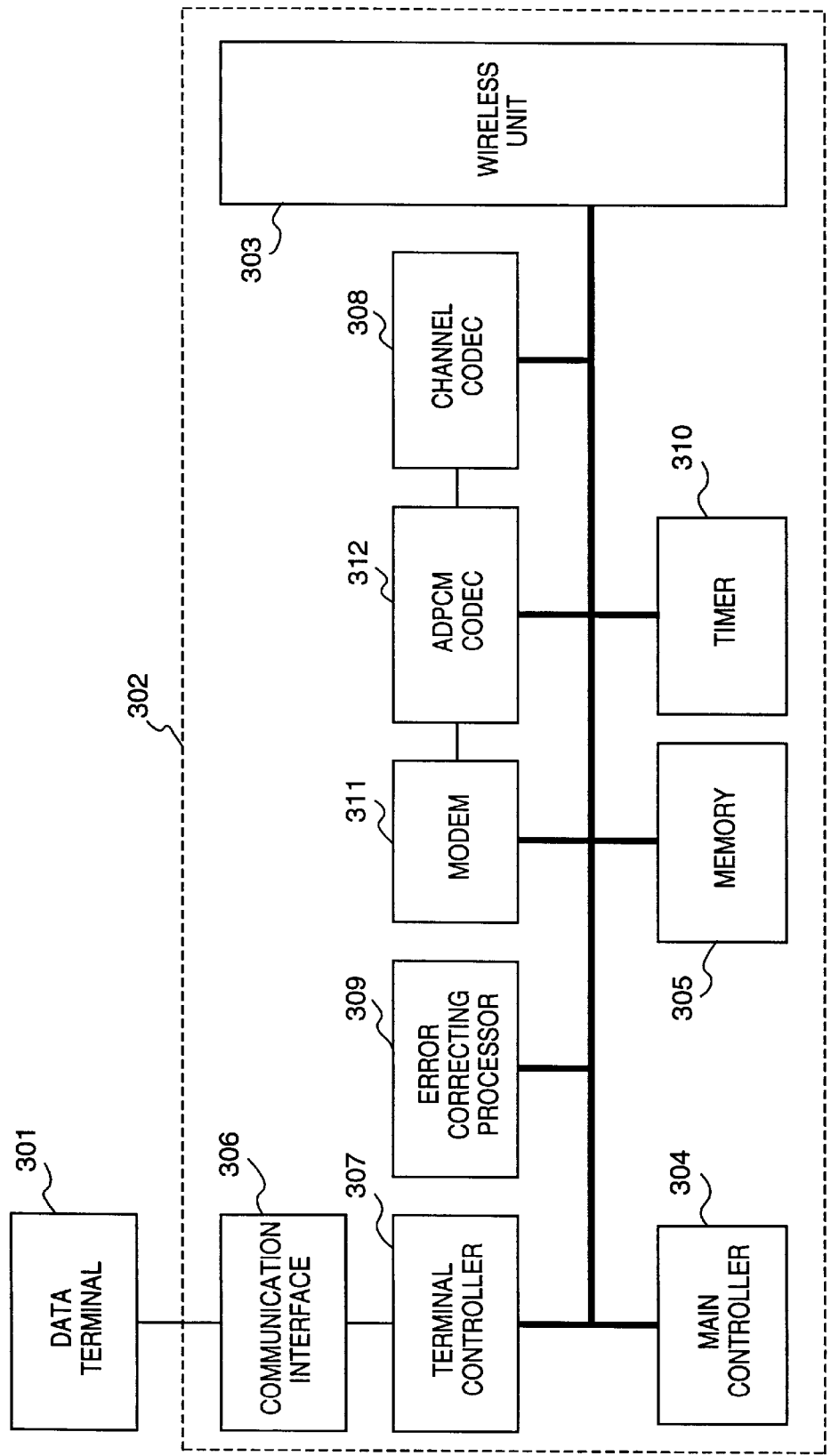
FIG. 3 is a block diagram showing the architecture of wireless adapter connected to a data terminal in the embodiment of the invention.

FIG. 3 is a block diagram illustrating architecture of a wireless adapter connected to a data terminal capable of being accommodated in a system.

As shown in FIG. 3, a data terminal 301 is connected to a wireless adapter 302 having a wireless unit 303. The data terminal 301 is, say, a personal computer, a work station, a printer, a facsimile machine or some other terminal device connected to the wireless adapter 302 via a communication cable or internal bus. The wireless adapter 302 has a main controller 304, which controls the various blocks in the wireless adapter, comprising a CPU, peripherals for performing interrupt control and DMA control, etc., and an oscillator for a system clock. A memory 305 comprises a ROM for storing programs used by the main controller 304, and a RAM used as a buffer area for a variety of processing. The RAM is used also for storing hopping patterns employed in telecommunication. A communication interface (i/f) 306 is a communication i/f such as an RS232C, Centronics or LAN with which the data terminal 301 is provided as standard equipment, or a communication i/f such as an internal bus (e.g., ISA bus, PCMCIA i/f, etc.) in a personal computer or work station. A terminal controller 307 supervises a variety of communication control operations necessary at the time of data communication between the data terminal 301 and wireless adapter 302 via the communication i/f 306. A channel codec 308 performs frame processing and wireless control. Data assembled into a frame by the codec 308 is transmitted to a main unit or associated terminal via the wireless adapter 303. An error correcting processor 309 is used to reduce bit errors produced in data by radio telecommunication. The processor 309 inserts an error correcting code into the communication data at the time of a transmission. At the time of reception, on the other hand, the processor 309 computes error location and error pattern by processing and corrects bit errors contained in the received data. A timer 310 supplies a timing signal used by each block in the wireless adapter. A modem 311 modulates data to a voice band signal. An ADPCM coded 312 subjects an analog signal, which has modulated by the modem 311, to ADPCM coding.

Figure 4:
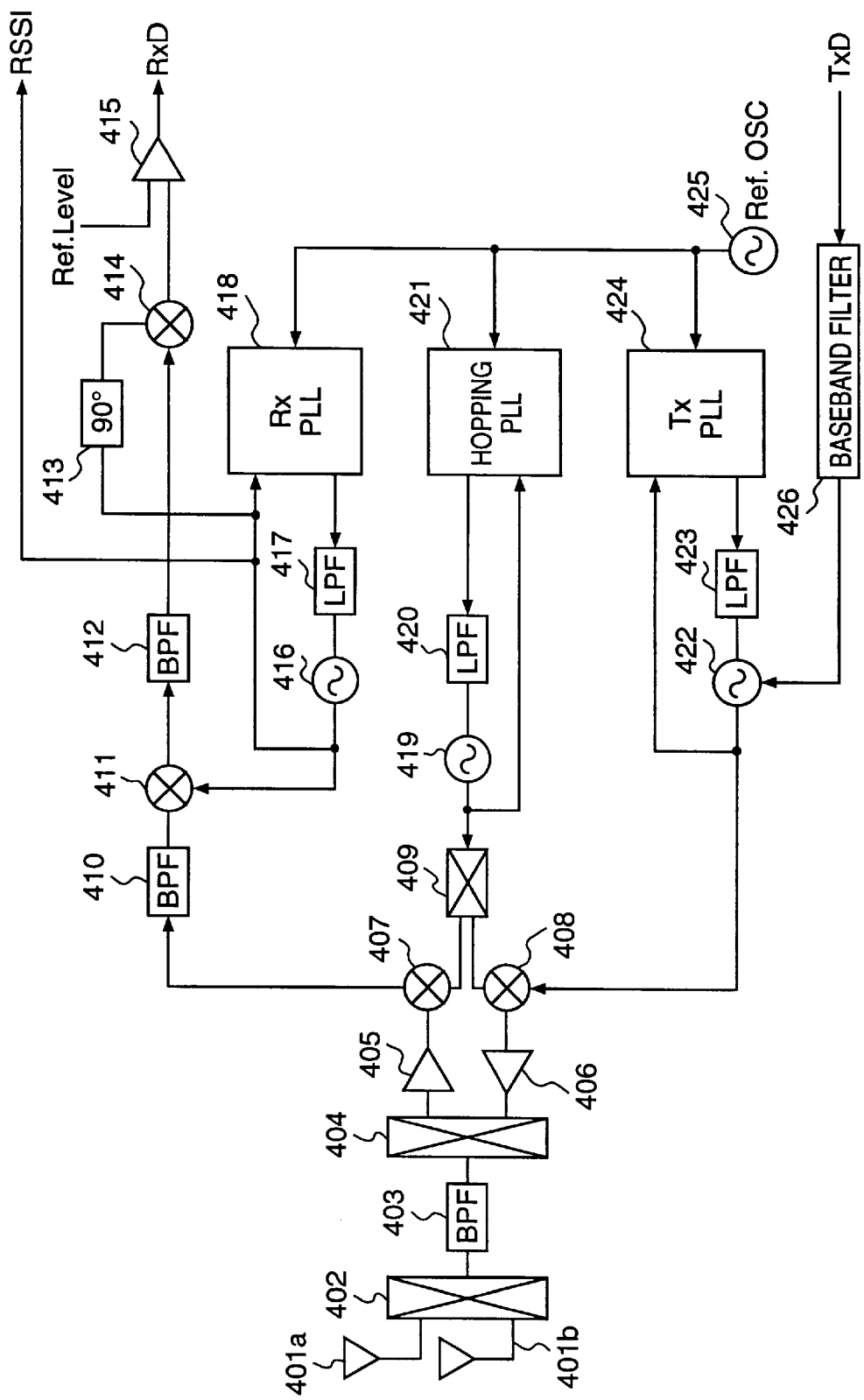
FIG. 4 is a diagram showing the architecture of a wireless unit in the embodiment of the invention.

FIG. 4 is a diagram illustrating the architecture of a wireless unit used commonly in the main unit, the radiotelephones and data terminals of this system. The wireless unit includes transceiving antennae 401a, 401b, a switch 402 for changing over between the antennae, a bandpass filter (referred to as a "BPF") 403 for removing signals in unnecessary bands, a switch 404 for switching between transmission and reception, an amplifier 405 for reception, an amplifier (with power controller) 406 for transmission, a down-converter 407 for a first IF (intermediate frequency), an up-converter 408, a switch 409 for switching between transmission and reception, a BPF 410 for eliminating signals in unnecessary bands from the signal converted by the down-converter 407, and a down-converter 411 for a second IF (intermediate frequency). Down-conversion reception is implemented by the down-converters 407 and 411.

The wireless unit further includes a second IF BPF 412, a 90° phase shifter 413, a quadrature detector 414 for detecting and demodulating a signal received by the BPF 412 and phase shifter 413, a comparator 415 for waveshaping, a voltage-controlled oscillator (referred to as a "VCO" below) 416 for reception, a low-pass filter (referred to as an "LPF" below) 417, and a phase-locked loop (referred to as a "PLL") 418 constituted by a programmable counter, prescaler and phase comparator, etc. A frequency synthesizer in the reception loop is constructed by the VCO 416, LPF 417 and PLL 418.

The wireless unit further includes a VCO 419 for generating a carrier signal, an LPF 420, and a PLL 421 constituted by a programmable counter, prescaler and phase comparator, etc. A frequency synthesizer for hopping is constructed by the VCO 419, LPF 420 and PLL 421. Further provided are a VCO 422 located in the transmission loop and having a modulating function, an LPF 423 and a PLL 424 constituted by a programmable counter, prescaler and phase comparator, etc. A frequency synthesizer located in the transmission loop and having a frequency modulating function is constructed by the VCO 422, LPF 423 and PLL 424.

The wireless unit further includes an oscillator 425 which generates a reference clock for the PLLs 418, 421 and 424, and a filter 426 for limiting the band of transmission data (baseband signal).

Figure 5:
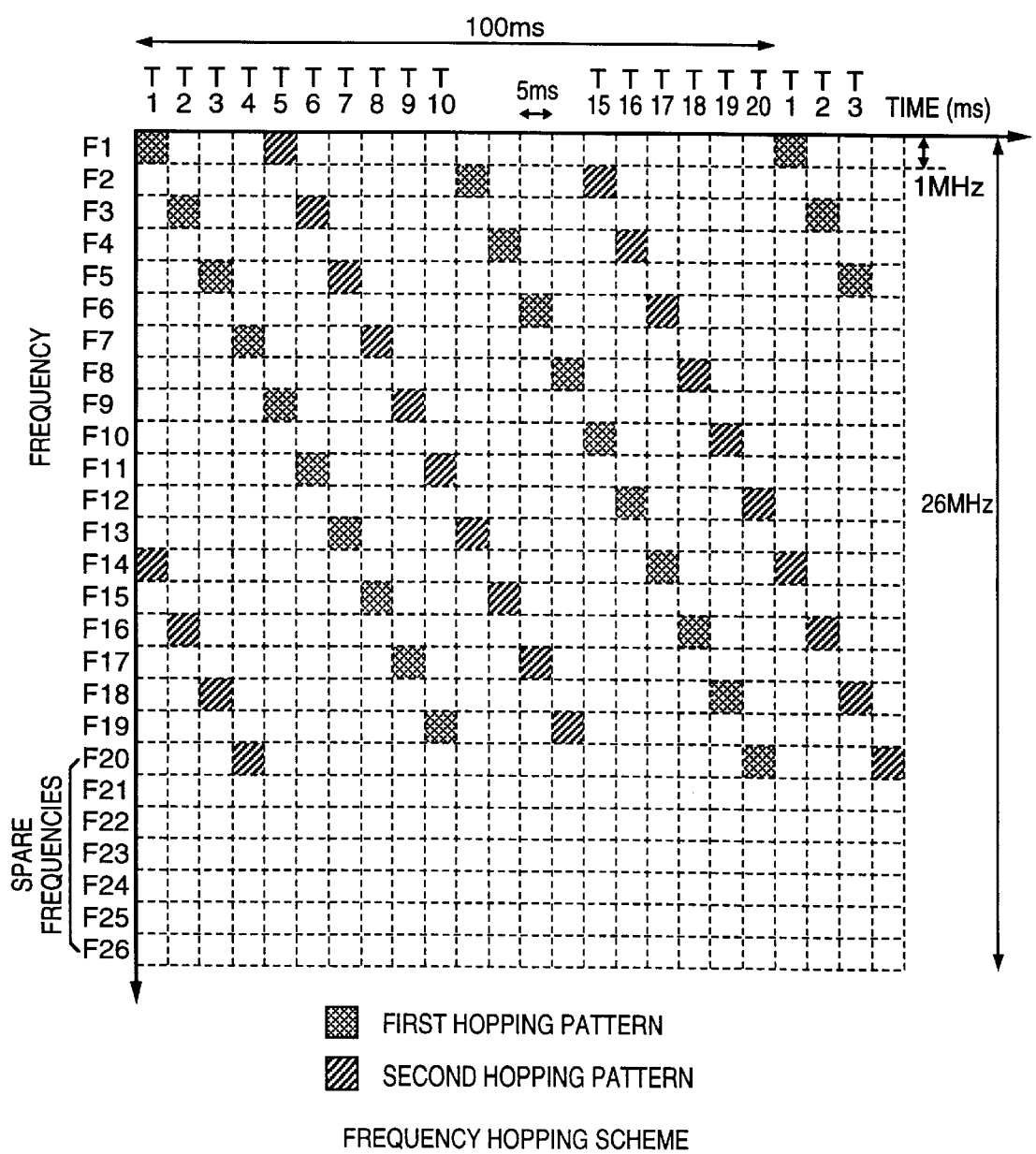
FIG. 5 is an explanatory view illustrating an example of hopping patterns in the embodiment of the invention.

FIG. 5 is an explanatory view illustrating an example of frequency hopping patterns.

Here frequency hopping is performed every frame, and the hopping period is 20 frames. One hopping period is divided up into 20 time slots. Accordingly, one frame is present in one time slot.

In FIG. 5, T1, T2, . . . represent time slots, and F1, F2, . . . represent frequency channels. In this embodiment, the frequency channels shown in FIG. 2 correspond to 2.484 GHz±13 MHz for which use of spread-spectrum schemes, the foremost of which is frequency hopping, are allowed in Japan.

Figure 6:
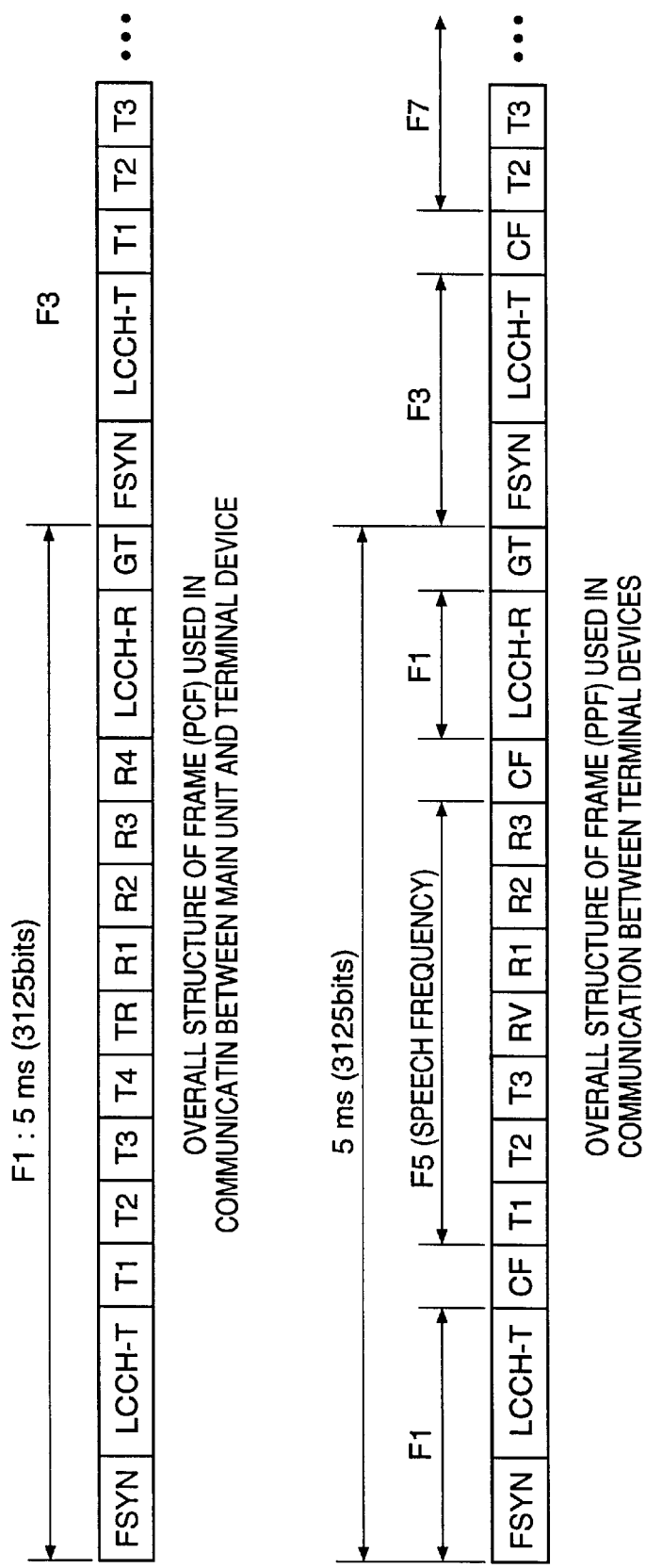
FIG. 6 is a diagram showing the structures of frames used in communication in the embodiment of the invention.

FIG. 6 is an explanatory view illustrating a communication frame (referred to as a "PCF" below) used in communication between a main unit and a terminal device and a communication frame (referred to as a "PPF" below) used in communication between terminal devices. Further, FIG. 7 is an explanatory view illustrating the structure of an FSYN frame and LCCH-T frame as well the structure of an LCCH-R frame. FIG. 8 is an explanatory view illustrating the structure of a Tn frame of T1~T4 and the structure of an Rn frame of R1~R4.

The symbols shown in FIGS. 6 through 8 will now be described. First, FSYN represents a frame which transmits information necessary for the entirety of the frames. Further, LCCH-T represents a logical control channel sent from the main unit to the terminal device, and LCCH-R represents a logical control channel sent from the terminal device to the main unit. These logical control channels are frames for an exchange of logical control information (LCCH) needed in communication, such as a connect request, disconnect request and connection information for specifying a party, such as telephone dialing information and LAN network address information. Further, each terminal device performs an exchange of LCCH in a time slot allocated by the main unit when communication is taking place.

Further, Tn and Rn represent communication channels used in communication. The communication channel Tn in the PCF frame is used when the main unit makes a transmission to a terminal device, and the channel Tn in the PPF frame is used when a terminal device that has originated a call makes a transmission to the main unit. The channel Rn in the PCF frame is used when a terminal device makes a transmission to the main unit, and the channel Rn in the PPF frame is used when a terminal device on the called side makes a transmission.

Further, CF represents frequency switching time, which is equivalent to 174 µs, CS is clearance time equivalent to 12.8 µs, and R represents a ramp bit equivalent to 6.4 µs, which covers send/receive changeover time.

Further, PR is a 62-bit preamble for achieving synchronization, SYN is a 31-bit frame sync signal, ID is a 63-bit call signal, and FI represents frame identification information, which is used to distinguish between PPF and PCF.

Further, TS and NF each represents 8-bit auxiliary information for hopping, UW is an 8-bit unique word, D is D-channel information, B is B-channel information, GT is guard time, TR is guard time for send/receive changeover, and RV represents a reserve bit.

An embodiment of the invention will be described taking as an example a case in which a certain terminal device A places an extension call to another terminal device B.

This embodiment will be described on the premise that the hopping patterns used in communication between a main unit and a terminal device have been predetermined or are decided in dependence upon the surrounding radio wave environment at start-up of the power supply and stored in the memories of the main unit and terminal device.

Figure 9:
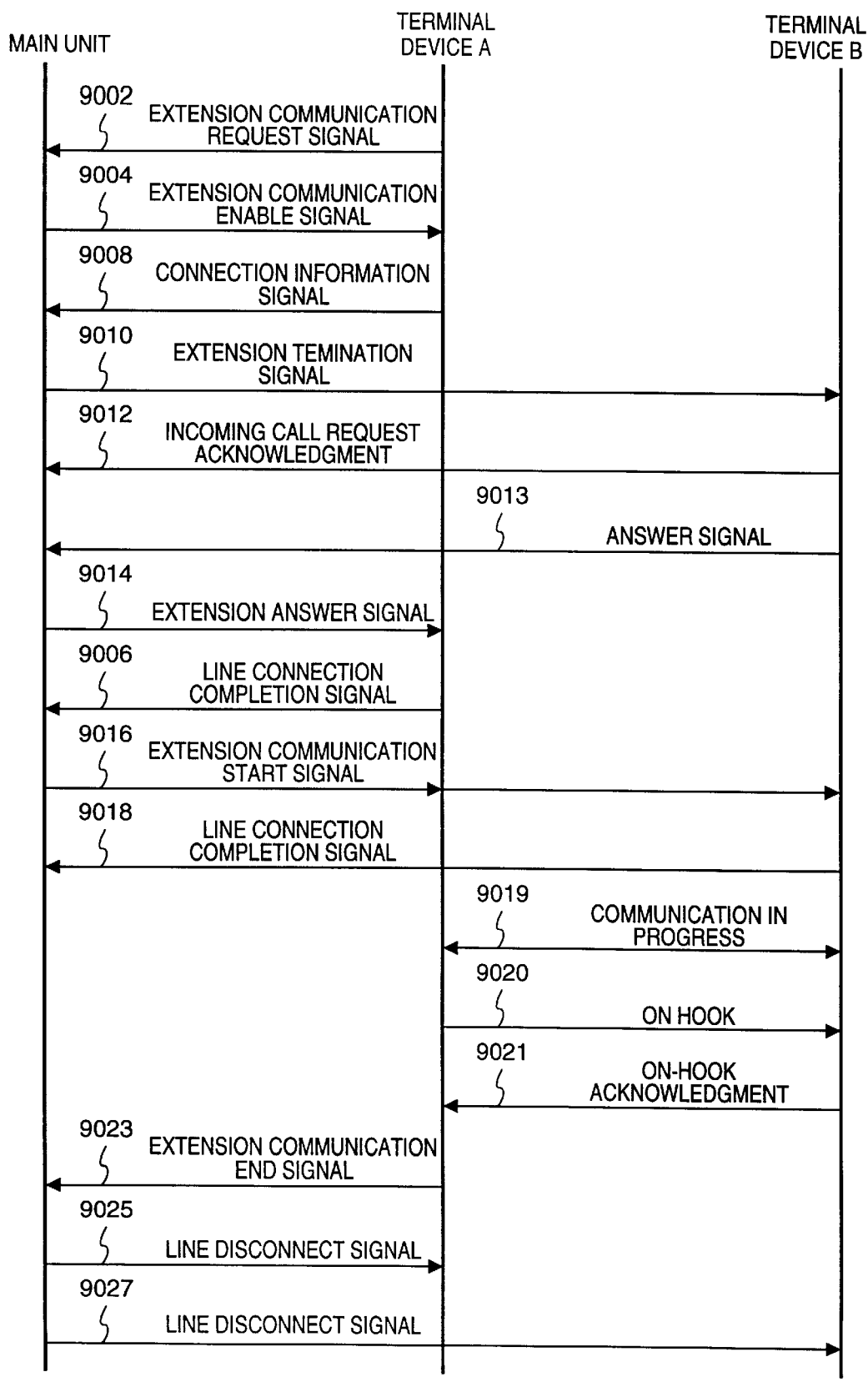
FIG. 9 is a sequence diagram showing the sequence of control data in the embodiment of the invention.
Figure 10:
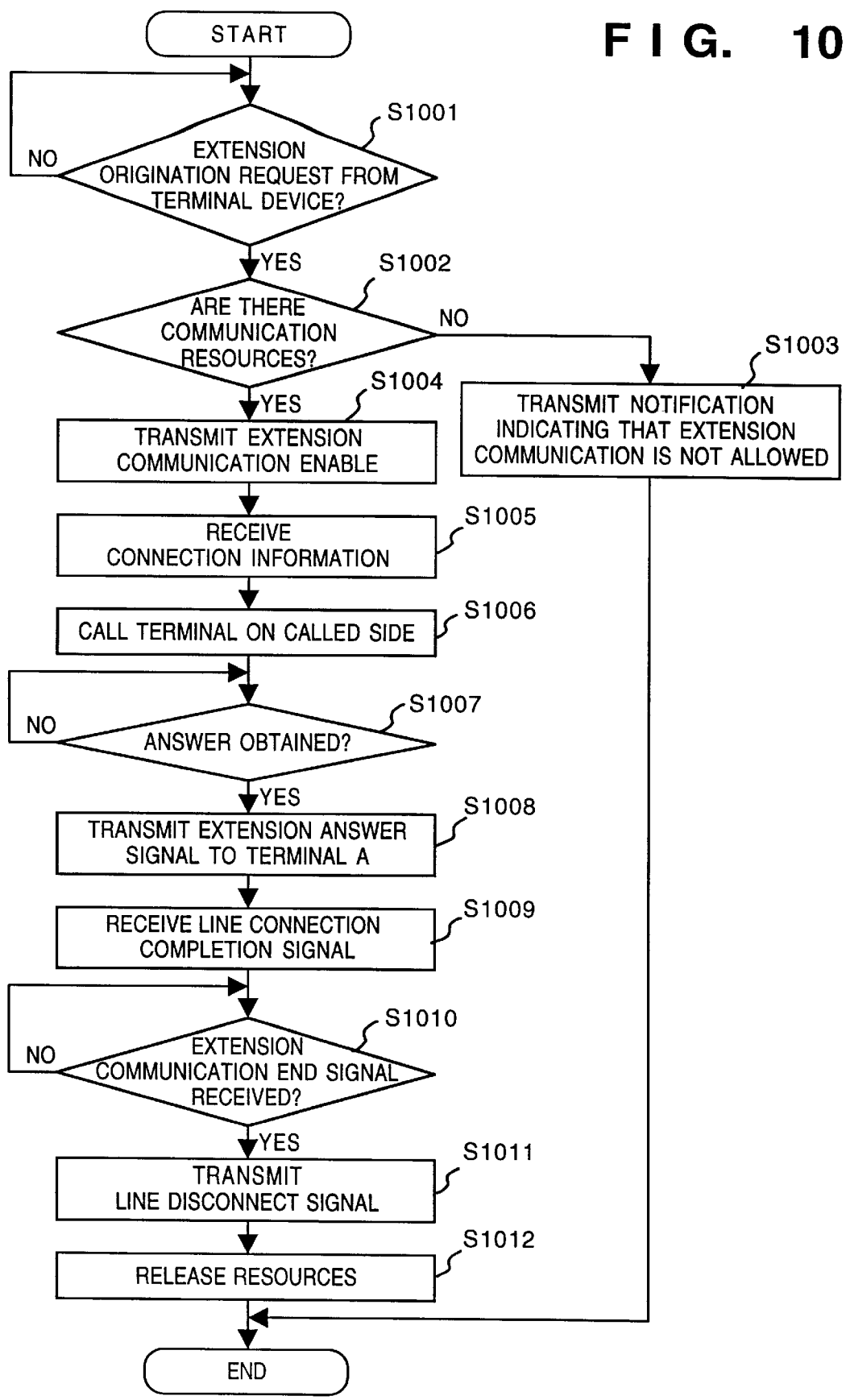
FIG. 10 is a flowchart showing the operation of a main unit in the embodiment of the invention.
Figure 11:
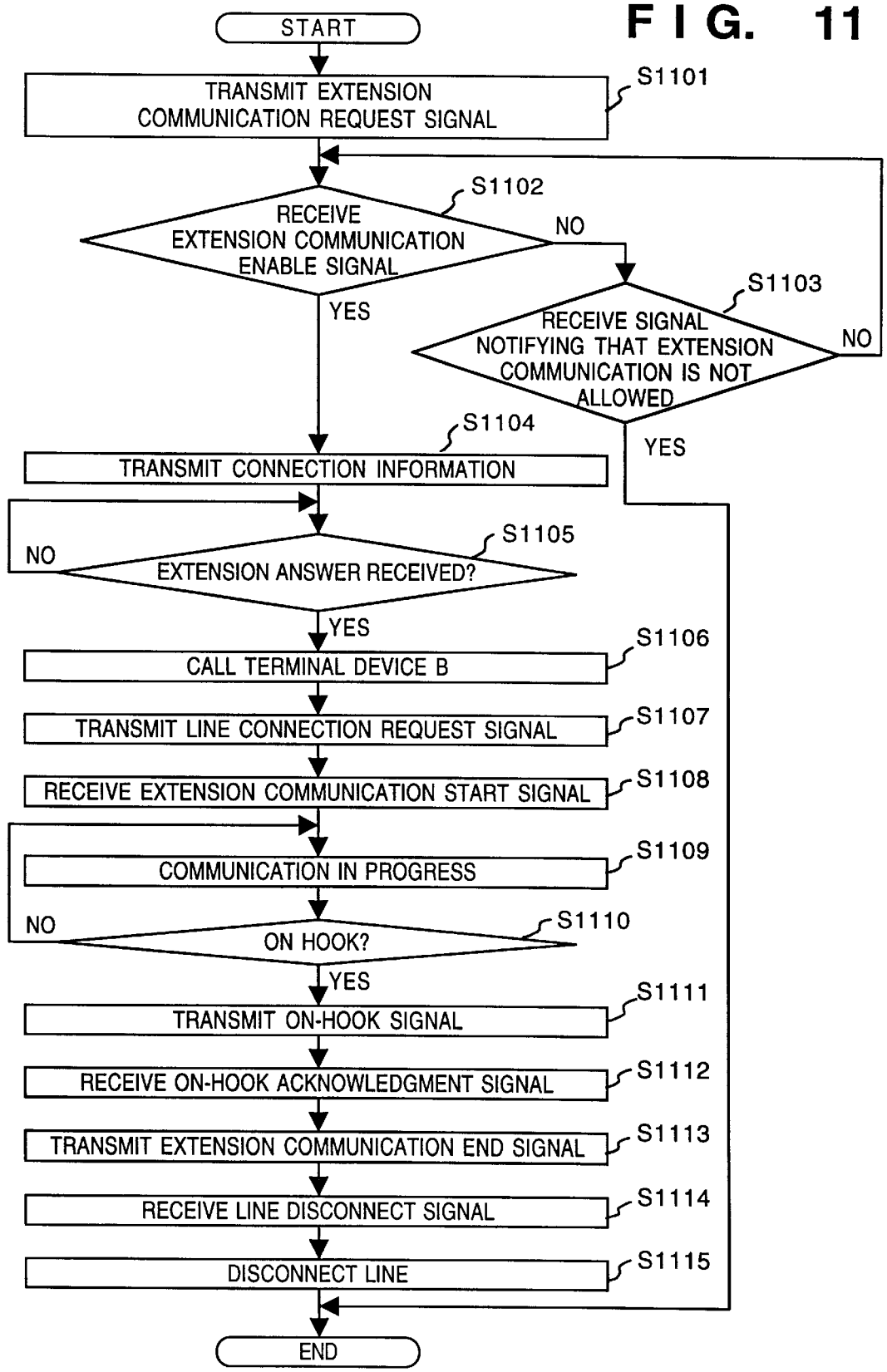
FIG. 11 is a flowchart showing the operation of a terminal device on the calling side in the embodiment of the invention.
Figure 12:
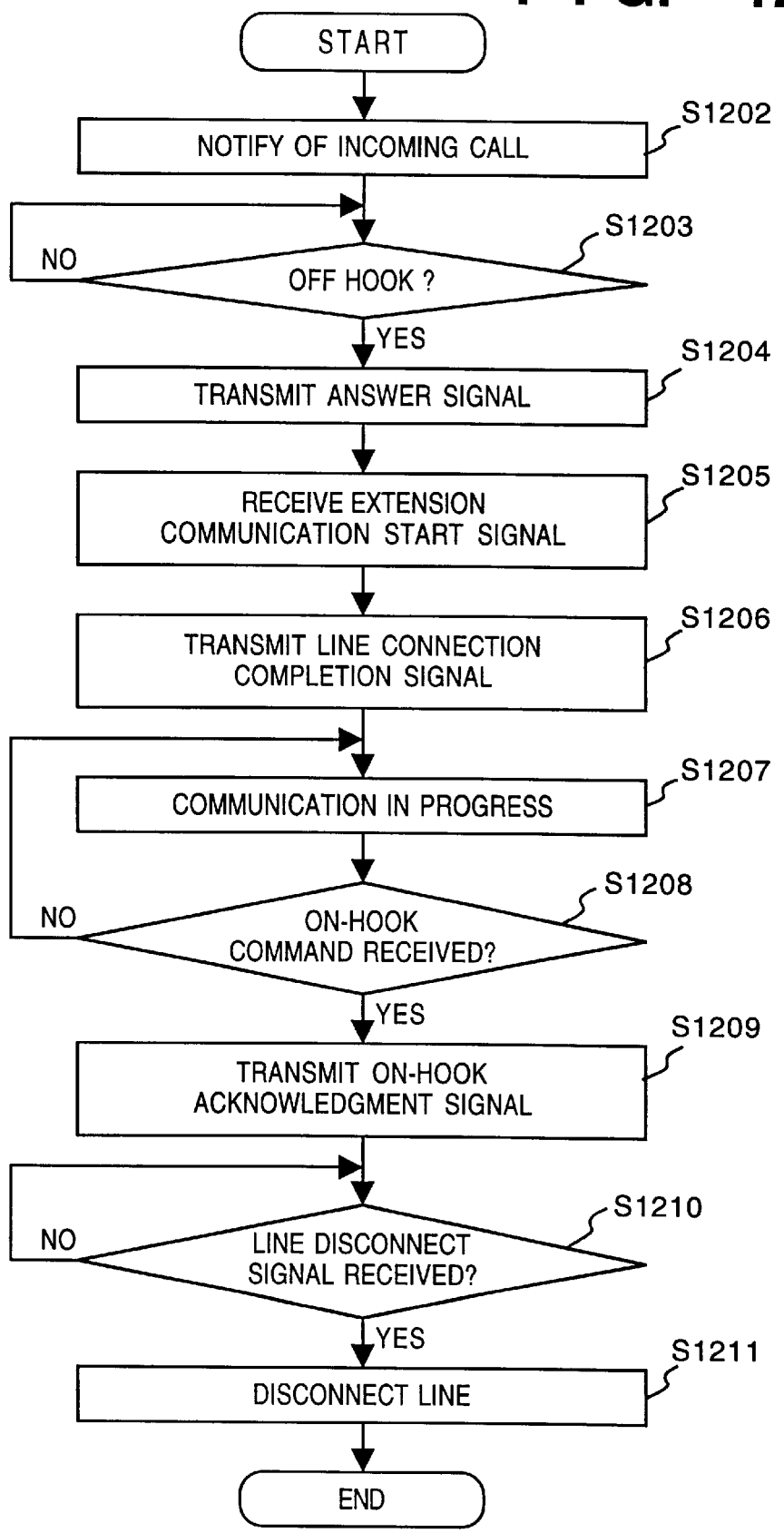
FIG. 12 is a flowchart showing the operation of a terminal device on the called side in the embodiment of the invention.

FIG. 9 is an explanatory view illustrating the sequence of control data in the main unit, terminal device A and terminal device B in extension communication. FIGS. 10, 11 and 12 are flowcharts illustrating the processing executed by the main unit, the calling terminal device A and the called terminal device B. FIGS. 9 through 12 primarily describe the processing that is related to the present invention.

First, the main unit monitors the status of communication of all of the communication devices in the system (step S1001). The results of monitoring indicate whether communication is in the progress and, in case of communication, they indicate the hopping pattern being used as well as the particular communication channel being specified in a frame. The results are stored in memory in regard to the item in question.

The hopping pattern used in communication between the terminal devices and the hopping pattern used in communication between the main unit and terminal device are selected in such a manner that the same frequency channel will not be used simultaneously in each case. When there is an extension connection request from the terminal device, therefore, it is so arranged that the main unit gives notification of just how much the hopping pattern used in communication between the terminal devices is to be shifted in time from the hopping pattern used in communication between the main unit and the terminal device.

In this embodiment, the first hopping pattern shown in FIG. 5 is adopted as the hopping pattern used in communication between the main unit and the terminal device. The second hopping pattern is adopted as a hopping pattern allocated for the purpose of extension communication. It will be understood from FIG. 5 that the second hopping pattern is obtained by delaying the first hopping pattern by four time slots.

(1) The user on the calling side enters connection information, such as dialing information or address information, representing the terminal of the party to which the connection is desired. In response to a line connection request from the user, the terminal device A sends an extension communication request signal 9002 to the main unit (S1101). This request signal is the LCCH-R contained in the PCF frame of FIG. 6 and is sent from the terminal device A to the main unit.

(2) The main unit refers to the above-mentioned results of monitoring, allocates resources for the communication requested and, together with these resources, sends an extension communication enable signal 9004 to the terminal device A by way of the logical control channel LCCH-T (S1002). The resources include the slot number of an unused communication channel in the PPF frame and the number of time slots the hopping pattern should be shifted to obtain the hopping pattern of the PPF frame. By sending the signal 9004, notification is given of the fact that the call request has been accepted. In this embodiment, notification is given so as to use a hopping pattern that has been delayed by four time slots. In the absence of communication resources ("NO" at S1002), the main unit transmits notification of the fact that extension communication is not allowed (S1003) and terminates processing.

(3) Upon receiving the extension communication enable signal 9004 and the above-mentioned resources ("YES at S1102), the terminal device A stores these resources in memory and sends a connection information signal 9008 to the main, unit by utilizing the LCCH-T (S1104). Upon receiving the connection information signal 9008 ("YES" at S1105), the main unit refers to this connection information 9008 and the memory storing the monitored status of the terminal devices in the system and verifies whether the terminal device B whose connection has been requested by terminal device A is currently communicating. If the terminal device B is currently communicating, then the main unit sends a signal indicative of communication in progress back to the terminal device A, releases the resources and ends processing.

(4) If the terminal device B is found not to be communicating in (3) above, the main unit notifies the terminal device B of a call termination request by an extension termination signal 9010 using the logical control channel LCCH-T. Further, the main unit notifies of resources such as the slot number of the communication channel used in the PPF frame necessary for communication and the number of time slots the hopping pattern should be shifted to obtain the hopping pattern of the PPF frame (S1006).

(5) Upon receiving the extension termination signal 9010 and the resources, the terminal device B stores these resources, sends incoming-call request acknowledgment 9012 to the main unit and notifies the user of the incoming call (S1202). Further, on the basis of the stored resources, the terminal device B changes to the hopping pattern specified by the main unit. When the user takes the handset off the hook ("YES" at S1203), the terminal device B transmits an answer signal to the main unit (S1204).

(6) Upon receiving an answer from the terminal device B (S1007), the main unit notifies the terminal device A, by way of an extension answer signal 9014, of the fact that an answer has been received from the terminal device B (S1008).

(7) Upon receiving the extension answer signal 9014, the terminal device A, on the basis of the stored resources, changes to the hopping pattern specified by the main unit and calls the terminal device B without the intermediary of the main unit (S1106). Thereafter, the terminal device A and the terminal device B communicate with each other, without the intermediary of the main unit, using the PPF frame shown in FIG. 6.

(8) When the terminal device B answers, the terminal device A so informs the main unit by a line connection completion signal 9006 utilizing LCCH-R of the PCF frame (S1009, S1107). As are sult, the main unit sends an extension communication start signal 9016 to the terminal devices A and B. When the terminal device B receives the extension communication start signal 9016, it transmits a line connection completion signal 9018 to the main unit (S1205, S1206).

In a case where the terminal devices A and B happen to be located where they cannot communicate with each other directly, the terminal device A calls the terminal device B a number of times and uses LCCH-R to notify the main unit of the fact that the terminal device B does not answer. In such case the PPF frame is changed to the PCF frame and communication takes place via the main unit.

(9) If, by way of the processing in (8) above, the terminal device A receives the extension communication start signal 9016 from the main unit (S1108) and the terminal device B transmits the line connection completion signal (S1206), the connection between the terminal devices A and B is completed and these terminal devices begin communicating (S1109, S1207).

(10) At the end of communication, an on-hook signal is sent to either of the terminal devices. In the example illustrated here an on-hook signal 9020 is sent from the terminal device A to the terminal device B. The on-hook signal 9020 is sent to the terminal device B from the terminal device A when an operation equivalent to hanging up is performed by the terminal device A. Upon receiving the on-hook signal 9020 from the terminal device A, the terminal device B sends an on-hook acknowledgment signal 9021 back to the terminal device A (S1110~S1112, S1208, S1209).

(11) Upon receiving the on-hook acknowledgment signal 9021 from the terminal device B, the terminal device A sends an extension communication end signal 9023 to the main unit by utilizing the LCCH-R (S1113).

(12) Upon receiving the extension communication end signal 9023, the main unit uses the LCCH-T to transmit line disconnect signals 9025, 9027 to the terminal devices A and B and releases resources (S1010~S1012). After the line disconnect signals 9025, 9027 are received (S1114, S1210), the terminal devices A and B return to the hopping pattern for communication between the main unit terminal devices and enter a standby state in which only the LCCH is exchanged with the main unit and in which the next signal is awaited (S1115, S1211).

Thus, in accordance with the present invention, as described above, the main unit responds to a terminal device vs. terminal device communication request from a terminal device by notifying this terminal device of the hopping pattern being used between the main unit and the terminal device as well as of the extent to which the hopping pattern is to be shifted in terms of time. This makes it possible to increase the number of system lines through a simple arrangement.

Further, the time needed to notify a terminal device of hopping patterns can be shortened by a wide margin.

Furthermore, the hopping patterns used in communication with the main unit are stored by the terminal device and the terminal device need only communicate upon effecting a shift in time of which it has been notified by the main unit. This makes it possible to reduce the capacity of the memory used to store hopping patterns.

In addition, since hopping patterns used in communication between the main unit and a terminal device and in communication between terminal devices are shifted in terms of time, identical frequencies are not used simultaneously. This eliminates interference between the two kinds of communication.

As many apparently widely different embodiments of the present invention can be made without departing from the spirit and scope thereof, it is to be understood that the invention is not limited to the specific embodiments thereof except as defined in the appended claims.

What is claimed is:

1. A radio communication system for performing communication using frequency hopping, comprising:
   a radio control unit, and
   a plurality of radio communication units each radio communication unit being controlled wirelessly by said radio control unit;
   said radio control unit including:
      first storage means for storing a predetermined hopping pattern; and
      transmitting means for transmitting wirelessly information, which is for generating another hopping pattern from the predetermined hopping pattern, to a radio communication unit; and
   each said radio communication unit including:
      second storage means for storing the predetermined hopping pattern;
      receiving means for receiving said information transmitted wirelessly by said transmitting means; and
      communication means for generating another hopping pattern by causing the predetermined hopping pattern to be shifted, based upon said information received by said receiving means, and for communicating with another said radio communication unit by using the other hopping pattern in a case where communication is performed within a area controlled wirelessly by said radio control unit,
   wherein said transmitting means transmits information, which differs for every hopping pattern to be used in a case where a plurality of hopping patterns are used within the area controlled by said radio control unit.

2. The system according to claim 1, wherein said radio communication unit performs communication using said communication means when a first radio communication unit communicates with a second communication unit.

3. The system according to claim 1, wherein said radio control unit and said radio communication unit perform communication using the predetermined hopping pattern.

4. The system according to claim 1, wherein the predetermined hopping pattern is composed of a time element and a frequency element and is stored in said first storage means and in said second storage means.

5. The system according to claim 1, wherein the information transmitted by said transmitting means is information indicating how much the predetermined hopping pattern is shifted in time before being used.

6. The system according to claim 1, wherein said radio control unit has decision means for deciding said information on the basis of status of communication within said system, and said transmitting means transmits the information decided by said decision means to said radio communication unit.

7. The system according to claim 1, wherein said system has a plurality of said radio communication units, and said information is information such that the same frequency will not be used at the same time in hopping patterns employed in all communications.

8. The system according to claim 1, wherein said predetermined hopping pattern is stored in said first storage means in advance.

9. The system according to claim 1, wherein said predetermined hopping pattern is decided at start-up of system power and is stored in said first storage means.

10. A radio communication apparatus, which is capable of controlling wirelessly a plurality of radio communication units, for performing communication using frequency hopping, comprising:
    storage means for storing a predetermined hopping pattern; and
    transmitting means for transmitting wirelessly, to a radio communication unit controlled wirelessly, information which is for generating another hopping pattern for communicating between first and second radio communication units by causing the predetermined hopping pattern to be shifted in a case where communication between the first and second radio communication unites is performed within an area controlled wirelessly by said radio communication apparatus,
    wherein said transmitting means transmits information, which differs for every hopping pattern to be used in case where a plurality of hopping patterns are used within the area controlled by said radio communication apparatus.

11. The apparatus according to claim 10, wherein the information transmitted by said transmitting means is used for communicating directly between the first and second radio communication units.

12. The apparatus according to claim 10, wherein the predetermined hopping pattern is composed of a time element and a frequency element and is stored in said first storage means and in said storage means.

13. The apparatus according to claim 10, wherein the information transmitted by said transmitting means is information indicating how much the predetermined hopping pattern is shifted in time.

14. The apparatus according to claim 10, wherein the information transmitted by said transmitting means is information such that the same frequency will not be used at the same time in hopping patterns employed in other communication.

15. The apparatus according to claim 10, wherein said predetermined hopping pattern is stored in said storage means in advance.

16. The apparatus according to claim 10, wherein said predetermined hopping pattern is decided at start-up of system power and is stored in said first storage means.

17. A radio communication apparatus, which is controlled wirelessly by a radio control unit, for performing communication using frequency hopping, comprising:
    storage means for storing a predetermined hopping pattern;
    receiving means for receiving information, which has been transmitted wirelessly by said radio control unit, for causing the predetermined hopping pattern to be shifted; and
    communication means for generating another hopping pattern for communication with another radio communication apparatus by causing the predetermined hopping pattern to be shifted, based upon the information received by said receiving means, and for communicating with the other radio communication apparatus by using the other hopping pattern in a case where communication with the other radio communication apparatus is performed within an area controlled wirelessly by said radio control unit,
    wherein said receiving means receives information, which differs for every hopping pattern to be used in a case where a plurality of hopping patterns are used within the area controlled by said radio control unit.

18. The apparatus according to claim 17, wherein said communication means communicates with a first radio communication apparatus that is different from a second radio communication apparatus that has transmitted the information received by said receiving means.

19. The apparatus according to claim 17, wherein the predetermined hopping pattern is composed of a time element and a frequency element and is stored in said storage means.

20. The apparatus according to claim 17, wherein the information received by said receiving means is information indicating how much the predetermined hopping pattern is shifted in time; and said communication means performs communication upon shifting said predetermined hopping pattern in time based upon said information.

21. The apparatus according to claim 17, wherein the information received by said receiving means is information such that the same frequency will not be used at the same time in hopping patterns employed in other communication.

22. The apparatus according to claim 17, wherein said predetermined hopping pattern is stored in said storage means in advance.

23. The apparatus according to claim 17, wherein said predetermined hopping pattern is decided at start-up of system power and is stored in said storage means.

24. A method of controlling a radio communication system, which has a radio control unit and a plurality of radio communication units, each radio communication unit being controlled wirelessly by the radio control unit for performing communication using frequency hopping, comprising:

a transmitting step of transmitting wirelessly information, which is for generating another hopping pattern from a predetermined hopping pastern that has been stored in memory, from the radio control unit to a radio communication unit;

a receiving step of receiving the information transmitted at said transmitting step; and a communication step of generating another hopping pattern by causing the predetermined hopping pattern to be shifted, which has been stored in memory, based upon the information received at said receiving step, and of communicating with another radio communication unit by using the second hopping pattern in a case where communication is performed within an area controlled wirelessly by the radio control unit, wherein said transmitting step transmits information, which differs for every hopping pattern to be used in a case where a plurality of hopping patterns are used within the area controlled by the radio control unit.

25. The method according to claim 24, wherein said receiving step is implemented when a first radio communication unit communicates with a second radio communication unit without intermediary of said radio control unit.

26. The method according to claim 24, wherein said predetermined hopping pattern is used when said radio control unit communicates with said radio communication unit.

27. The method according to claim 24, wherein said predetermined hopping pattern is composed of a time element and a frequency element and is stored in said memory.

28. The method according to claim 24, wherein the information transmitted at said transmitting step is information indicating how much the predetermined hopping pattern is shifted in time before being used.

29. The method according to claim 24, further comprising a decision step of deciding by said radio control unit said information on the basis of status of communication within said system;

said transmitting step transmitting the information decided at said decision step to said radio communication unit.

30. The method according to claim 24, wherein said system has a plurality of said radio communication units, and said information transmitted at said transmitting step is information such that the same frequency will not be used at the same time in hopping patterns employed in all communications.

31. The method according to claim 24, wherein said predetermined hopping pattern is stored in a memory in said radio control unit and in a memory in said radio communication unit.

32. The method according to claim 24, wherein said predetermined hopping pattern is decided at start-up of system power and is stored in a memory in said radio control unit and in a memory in said radio communication unit.

33. A method of controlling wirelessly a plurality of radio communication units which perform communication using frequency hopping, comprising:

a transmitting step of transmitting wirelessly, to another radio communication unit controlled wirelessly, information which is for generating another hopping pattern for communicating between first and second radio communication units by using a predetermined hopping pattern that is shifted, which has been stored in memory in a case where communication units is performed with in an area controlled wirelessly, wherein said transmitting step transmits information, which differs for every hoppaing pattern to be used in a case where a plurality of hopping patterns are used within the area.

34. The method according to claim 33, wherein the information transmitted at said transmitting step is used for communicating directly between the first and second radio communication units.

35. The method according to claim 33, wherein the predetermined hopping pattern is composed of a time element and a frequency element and is stored in said memory.

36. The method according to claim 33, wherein the information transmitted at said transmitting step is information indicating how much the predetermined hopping pattern is shifted in time.

37. The method according to claim 33, wherein the information transmitted at said transmitting step is information such that the same frequency will not be used at the same time in hopping patterns employed in other communication.

38. The method according to claim 33, wherein said predetermined hopping pattern is stored in said memory in advance.

39. The method according to claim 33, wherein said predetermined hopping pattern is decided at start-up of power and is stored in memory.

40. A method of controlling a radio communication apparatus, which is controlled wirelessly by a radio control unit, for performing communication using frequency hopping, comprising:

a receiving step of receiving information, which has been transmitted wirelessly by the radio control unit, for causing a predetermined hopping pattern that is shifted, and which has been stored in memory; and a communication step of generating another hopping pattern for communicating with another radio communication apparatus by causing the predetermined hopping pattern to be shifted, based upon the information received at said receiving step, and of communicating with the other radio communication apparatus by using the second hopping pattern in a case where communication with the other radio communication apparatus is performed within an area controlled wirelessly by the radio control unit, wherein said receiving step receives information, which differs for every hoping pattern to be used in a case where a plurality of hopping patterns are used within the area controlled by the radio control unit.

41. The method according to claim 40, wherein said communication step is a step of communicating with a first radio communication apparatus that is different from a second radio communication apparatus that has transmitted the information received at said receiving step.

42. The method according to claim 40, wherein the predetermined hopping pattern is composed of a time element and a frequency element and is stored in said memory.

43. The method according to claim 40, wherein the information received at said receiving step is information indicating how much the predetermined hopping pattern is shifted in time; and said communication step is a step of performing communication upon shifting said predetermined hopping pattern in time based upon said information.

44. The method according to claim 40, wherein the information received at said receiving step is information such that the same frequency will not be used at the same time in hopping patterns employed in other communication.

45. The method according to claim 40, wherein said predetermined hopping pattern is stored in said memory in advance.

46. The method according to claim 40, wherein said predetermined hopping pattern is decided at start-up of power and is stored in said memory.

47. The system according to claim 2, wherein the first radio communication unit communicates with the second radio communication unit via the radio control unit in a case where the first radio communication unit cannot communicate with the second radio communication unit directly.

48. The apparatus according to claim 18, wherein the radio communication apparatus communicates with the first radio communication apparatus via the second radio communication apparatus in a case where the radio communication apparatus cannot communicate with the first radio communication apparatus directly.

49. The method according to claim 25, wherein the first radio communication unit communicates with the second radio communication unit via the radio control unit in a case where the first radio communication unit cannot communicate with the second radio communication unit directly.

50. The method according to claim 41, wherein the radio communication apparatus communicates with the first radio communication apparatus via the second radio communication apparatus in a case where the radio communication apparatus cannot communicate with the first radio communication apparatus directly.

* * * * *

UNITED STATES PATENT AND TRADEMARK OFFICE
CERTIFICATE OF CORRECTION

PATENT NO. : 6,078,609

DATED : June 20, 2000

INVENTOR(S): HIDETADA NAGO

Page 1 of 3

It is certified that error appears in the above-identified patent and that said Letters Patent is hereby corrected as shown below:

COVER PAGE AT ITEM NO. [56] RC:
U.S. Patent Documents: "586,142 1/1897 Takiyasu et al. ....370/480" should read --5,862,142 1/1999 Takiyasu et al. ......370/480--.

SHEET NO. 6:
Figure 6, "COMUNICATIN" should read --COMMUNICATION--.

COLUMN 2:
Line 53, "of" should read --of a--.

COLUMN 6:
Line 28, "in case" should read --in the case--.
Line 66, "Aby" should read; --A by--.

COLUMN 7:
Line 2, "slots" should read --slots of--.
Line 14, "main," should read --main--.
Line 59, "are sult," should read --a result,--.

COLUMN 8:
Line 4, "such" should read --such a--.

COLUMN 9:
Line 25, "a" should read --an--.

UNITED STATES PATENT AND TRADEMARK OFFICE
CERTIFICATE OF CORRECTION

PATENT NO. : 6,078,609

DATED : June 20, 2000

INVENTOR(S): HIDETADA NAGO

It is certified that error appears in the above-identified patent and that said Letters Patent is hereby corrected as shown below:

COLUMN 10:
Line 10, "unites" should read --units--.
Line 13, "in" should read --in a--.

COLUMN 11:
Line 24, "unit" should read --unit,--.
Line 28, "pastern" should read --pattern--.
Line 64, "system;" should read --system,--.

COLUMN 12:
Line 23, "units" should be deleted.
Line 24, "with in" should read --within--.
Line 26, "hoppaing" should read --hopping--.

UNITED STATES PATENT AND TRADEMARK OFFICE
CERTIFICATE OF CORRECTION

PATENT NO. : 6,078,609

DATED : June 20, 2000

INVENTOR(S): HIDETADA NAGO

It is certified that error appears in the above-identified patent and that said Letters Patent is hereby corrected as shown below:

<u>COLUMN 13</u>:
Line 4, "hoping" should read --hopping--.

Signed and Sealed this

Twenty-second Day of May, 2001

Attest:

NICHOLAS P. GODICI

Attesting Officer

Acting Director of the United States Patent and Trademark Office